United States Patent Office 3,054,760
Patented Sept. 18, 1962

3,054,760
POLYURETHANE FOAM CONTAINING ETHYLENE GLYCOL ANTIMONITE OR 1,2-PROPYLENE GLYCOL ANTIMONITE OR MIXTURES THEREOF
Michael Worsley, Bruce N. Wilson, and Blaine O. Schoepfle, all of Niagara Falls, N.Y., assignors to Hooker Chemical Corporation, Niagara Falls, N.Y., a corporation of New York
No Drawing. Filed Apr. 22, 1960, Ser. No. 23,904
10 Claims. (Cl. 260—2.5)

The present invention relates to compositions for producing flame-retardant foamed or cellular plastic products, and to the products produced therefrom. More particularly, the present invention resides in compositions for producing flame-retardant or cellular plastic products containing an antimony compound selected from the group consisting of ethylene glycol antimonite, 1,2-propylene glycol antimonite, and mixtures thereof. The present invention further resides in the cellular products produced therefrom.

The rigid plastic foams have found wide and varied use in industry. For instance, they may be used as core materials between skins of many and varied compositions. In aircraft construction the foam may be enclosed between aluminum or fiber glass reinforced plastic skins to form an assembly which is rigid, strong and yet remarkably light. Because of their excellent electrical properties polyurethane foams have also found use in the construction of radomes. The polyurethane foams have another useful property, they develop a high degree of adhesion during the foaming process. As a result they will adhere to skins composed of such varied materials as metals, plastics, ceramics, glass, etc. The resulting sandwich-type assemblies lend themselves well for use in such diverse fields as the construction and insulation industries.

The rigid plastic foams can also be utilized without skins as insulating materials to surround hot water or steam pipes, valves, etc. Their utility for such applications is enhanced by their ability to be applied, foamed, and used in situ.

The rigid plastic foams have many desirable properties. They have great structural strength coupled with low density. In sandwich-type construction they exhibit a high degree of rigidity, a property particularly desirable for building purposes. They are excellent vibration dampers and may thus support highly resonant loads. Because of their fine sell structure, they are excellent heat and sound insulators. The foam cells may be made very fine and uniform. In addition, the foam cells may be made tough and non-brittle and hence, highly resistant to rupturing.

The rigid polyurethane foams presently known to the art have several serious drawbacks. They burn rapidly and freely once ignited. Furthermore, during the foaming process large amounts of heat are liberated which may be so excessive that foamed sections may discolor or even char. It is very apparent that the lack of fire resistance in plastic foams is a serious obstacle to their use for structural and building purposes as well as for other purposes where safety and permanence are also important. The rigid polyurethane foams known to the art are also susceptible to degradation by the action of water, particularly at elevated temperatures. This drawback prevents their use in many applications.

The prior art teaches that polyurethane foams can be rendered more fire resistant by the incorporation of certain plasticizing substances. Among such plasticizing substances are the various neutral phosphate or phosphonate esters of chlorinated compounds. However, such plasticizing substances are additives which are not chemically combined with the polyurethane plastic and are progressively lost from the plastic by evaporation, leaching, etc. Consequently, such foams do not have a permanent fire resistance. Furthermore, the plasticizing additive affects the physical properties of the foam, particularly with regard to high temperature strength. The progressive addition of the plasticizer or additive improves the fire resistance, but generally impairs the physical characteristics of the foam, especially lowering the high temperature strength.

A proposed solution has been to prepare a rigid polyurethane foam containing chemically combined therein an adduct of hexahalocyclopentadiene, see for example, Serial No. 623,795, "Fire Resistant Foams," filed November 23, 1956. These compositions attain built-in fire resistance and to a large extent overcome the heretofore delineated disadvantages; however, the incorporation of greater than fifteen percent chlorine content by means of the disclosed dibasic acids results in a polyester of very high viscosity, with the product often being solid at room temperature. These solid materials are difficult to handle with conventional equipment, and do not rise and cure at room temperature.

Particularly desirable commercially, are polyurethane foams containing polyethers, due to the low cost and resistance to hydrolysis of the polyether. Previous attempts to render these foams fire retardant have proved unacceptable for various reasons. The physical characteristics of such foams are impaired when flame retardant plasticizers, such as the various neutral phosphat or phosphonate esters, are added to these compositions in amounts sufficient to produce a fire-resistant foam. The dimensional stability of the foam is especially affected, with severe shrinkage of the foam resulting. In addition, the high temperature strength and water resistance is decreased.

It is further desired to obtain a flame retardant polyurethane foam using antimony compounds while not disturbing the resilience of the resulting foam. Heretofore antimony compounds such as antimony trioxide, sodium antimonate and sodium antimony tartrate have been found to seriously disturb the resilience of the foam, thereby seriously impairing the utility of the resultant product. It is further desirable to obtain a flame retardant polyurethane foam using an antimony compound which does not exhibit a catalytic effect, such as is found in copending application Serial No. 803,820, "Antimony Compounds as Reaction Catalysts," filed April 3, 1959.

It is therefore an object of the present invention to provide a foamable, polyurethane composition based on a hydroxyl-containing polymer, especially polyesters, polyethers or mixtures thereof, which foamable composition may be used for the production of cellular plastic materials having a high degree of flame retardance.

It is a further object of the present invention to provide such a composition which has a low viscosity at room temperature so that it may be handled by conventional equipment, and which also is capable of expanding and curing at room temperature.

It is a still further object of the present invention to provide a high degree of flame retardance while retaining excellent physical properties so desirable in polyurethane foams, such as good resilience, good water resistance, good high temperature strength, and a minimum amount of foam shrinkage.

It is a still further object of the present invention to provide such a composition utilizing antimony compounds which do not exhibit a catalytic effect.

Further objects and advantages will appear hereinafter.

In accordance with the present invention it has been found that flame retardant polyurethane foams accomplishing the foregoing objects may be produced by utilizing a foamable composition which comprises the reaction product of (1) a hydroxyl-containing polymer having a hydroxyl number of between about twenty-five and nine hundred, (2) an organic polyisocyanate, (3) from about five to fifty percent by weight of an antimony compound selected from the group consisting of ethylene glycol antimonite, 1,2-propylene glycol antimonite, and mixtures thereof, and (4) a foaming agent. It has been found that the foregoing antimony compounds are insoluble in the reaction medium except at very high temperatures, and therefore do not exhibit a catalytic effect. Higher alkyl antimonites and 1,3-propylene glycol antimonite are soluble in the reaction medium at ambient temperatures, thus exhibiting a catalytic effect and therefore being inoperative as flame retardants.

The present invention may be used to obtain rigid, semi-rigid or flexible polyurethane foams, although the rigid foams are preferred due to the greater need for resilience, thermal stability, low viscosity reactants, and fire resistance. The rigid polyurethane foams utilize a highly branched, hydroxyl rich, hydroxyl-containing polymer having a hydroxyl number of between about two hundred and nine hundred. The flexible polyurethane foams utilize a linear, relatively hydroxyl poor hydroxyl-containing polymer, having a hydroxyl number of between about twenty-five and one hundred. If a hydroxyl-containing polymer with a hydroxyl number between about one hundred and two hundred is employed, a semi-rigid polyurethane foam is obtained.

The antimony compounds of the present invention, ethylene glycol antimonite which may be shown as $Sb_2(-O-CH_2-CH_2-O-)_3$ and 1,2-propylene glycol antimonite which may be shown as

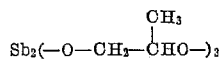

may be simply and conveniently prepared by heating antimony trioxide with either ethylene glycol or 1,2-propylene glycol with the resultant splitting off of water. The antimony compounds of the present invention may be utilized in amounts from about five to fifty percent by weight, and preferably about eight to twenty percent by weight.

Any hydroxyl containing polymer having a hydroxyl number of between about twenty-five and nine hundred may be used in the present invention, for example a polyester, a polyether or mixtures thereof. Generally, the hydroxyl containing polymers of the present invention have a molecular weight of from about two hundred to about four thousand.

The polyesters are the reaction products of a polyhydric alcohol and a polycarboxylic compound, said polycarboxylic compound being either a polycarboxylic acid, a polycarboxylic acid anhydride, a polycarboxylic acid ester, a polycarboxylic acid halide, or mixtures thereof. Among the polycarboxylic compounds which may be used to form the polyester are: maleic acid; fumaric acid; phthalic acid; tetrachlorophthalic acid; and aliphatic acids such as oxalic, malonic, succinic, glutaric, adipic, etc. Additional polycarboxylic compounds which may be used to form the polyester are Diels-Alder adducts of hexahalocyclopentadiene and a polycarboxylic compound wherein the halogen is selected from the group consisting of chlorine, bromine, fluorine and mixtures thereof, for example: 1,4,5,6,7,7-hexachlorobicyclo - (2.2.1) - 5-heptene-2,3-dicarboxylic acid; 1,4,5,6-tetrachloro - 7,7 - difluorobicyclo-(2.2.1)-5-heptene-2,3-dicarboxylic acid; 1,4,5,6,7,7-hexabromobicyclo-(2.2.1) - 5 - heptene - 2,3 - dicarboxylic acid; 1,4,5,6-tetrabromo - 7,7 - difluorobicyclo-(2.2.1)-5-heptene-2,3-dicarboxylic acid; etc. Mixtures of any of the above polycarboxylic compounds may be employed.

In order to obtain a satisfactory rigid foam, at least a portion of the total polyhydric alcohol component must consist of a polyhydric alcohol containing at least three hydroxyl groups. This is necessary in order to provide a means for branching the polyester. Where an even more rigid structure is desired, the whole alcohol component may be made up of a trifunctional alcohol such as glycerol. Where a less rigid final product is desired, a difunctional polyhydric alcohol such as ethylene glycol or 1,4-butanediol may be utilized as that part of the polyhydric alcohol component. Other glycols such as diethylene glycol, propylene glycol, etc. may also be used. Among the polyhydric alcohols which may be used are glycerol, hexanetriol, butanetriol, trimethylol propane, trimethylol ethane, pentaerythritol, etc. The ratio of the polyhydric alcohol such as glycerol to the polybasic acid may be expressed as the hydroxyl-carboxyl ratio, which may be defined as the number of moles of hydroxyl groups to the number of moles of carboxyl groups in a given weight of resin. This ratio may be varied over a wide range. Generally, however, a hydroxy-carboxyl ratio of between 1.5:1 to 5:1 is needed.

Instead of employing a polycarboxylic compound which is Diels-Alder adduct of hexahalocyclopentadiene and a polycarboxylic compound, we may employ a polyhydric alcohol which is a Diels-Alder adduct of hexahalocyclopentadiene and a polyhydric alcohol. This may be done by employing (A) a polyester resin comprised of the reaction product of (1) an adduct of hexahalocyclopentadiene and a polyhydric alcohol containing aliphatic carbon-to-carbon unsaturation, (2) a polycarboxylic compound, and (3) a polyhydric alcohol containing at least three hydroxyl groups. Typical adducts include: 2,3-dimethylol - 1,4,5,6,7,7 - hexachlorobicyclo-(2.2.1)-5-heptene; 2,3 - dimethylol - 1,4,5,6-tetrachloro-7,7-difluorobicyclo-(2.2.1)-5-heptene; etc. These compounds and others are disclosed in the copending application Serial Number 308,922, for "Polyhalogen-Containing Polyhydric Compounds," filed September 10, 1952, now U.S. Patent 3,007,958.

Where aromatic or bicyclo carboxylic compounds are used, it is often desirable to incorporate aliphatic acids as part of the polyester resin. Adipic acid is generally preferred for this purpose, although other suitable acids may be used such as oxalic, malonic, succinic, glutaric, pimelic, suberic, azelaic, etc. Unsaturated acids such as maleic, fumaric, itaconic, citraconic, aconitic, etc., may also be used.

The preferred polyesters of the present invention are those which contain an adduct of hexahalocyclopentadiene coreacted in the polyester portion in view of the fact that they contain a large amount of stable chlorine, thereby enhancing the flame-retardant characteristics of the resultant foam. Particularly preferred, are those polyesters wherein the adduct is reacted in the polycarboxylic portion of the polyester, due to lower cost and commercial availability of the polycarboxylic adducts of hexahalocyclopentadiene.

The polyethers employed are the reaction products of (1) either a polyhydric alcohol or a polycarboxylic acid, and (2) a monomeric 1,2-epoxide possessing a single 1,2-epoxy group, such as, for example, propylene oxide. The polyhydric alcohols which may be employed are any of the polyhydric alcohols hereinbefore listed. The polycarboxylic acids which may be employed are any of the polycarboxylic acids noted hereinbefore. Examples of monomeric 1,2-epoxides includes ethylene oxide, propylene oxide, butylene oxide, isobutylene oxide, 2,3-epoxyhexane, 3-ethyl-2,3-epoxyoctane, epichlorohydrin, epibromohydrin, styrene oxide, glycidyl ether, methyl glycidyl ether, phenyl glycidyl ether, butyl glycidyl sulfide, glycidyl methyl sulfone, glycidyl methacrylate, glycidyl acrylate, glycidyl benzoate, glycidyl acetate, glycidyl octanoate, glycidyl sorbate, glycidyl allyl phthalate, phenyl-(p-octadecyloxybenzoyl) ethylene oxide.

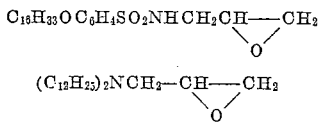

and the like. The preferred monoepoxides are the monoepoxide substituted hydrocarbons, the monoepoxy-substituted ethers, sulfides, sulfones and esters wherein the said compounds contain no more than eighteen carbon atoms. A lower alkylene oxide is preferably employed in rigid foams as the higher counterparts yield flexible rather than rigid products.

It is preferred in the present invention to obtain a polyurethane foam containing both the heretofore mentioned antimony compounds and halogen, especially chlorine, since the dual effect of the antimony and the halogen in the resultant polyurethane foam is greater than the additive effect of the individual components. Especially preferred, is polyurethane compositions having a halogen content of from three to twenty percent.

A large number of various organic polyisocyanates may be used. The aromatic polyisocyanates are more reactive and less toxic than the aliphatic members, and are consequently preferred. The compounds which are at present most readily available commercially are 2,4-tolylene diisocyanate, 2,6-toylene diisocyanate and mixtures thereof. However, others may be used, among them methylene-bis(4-phenyl isocyanate), 3,3'-bitolylene-4,4'-diisocyanate, 3,3-dimethoxy-4,4'-biphenylene diisocyanate, naphthalene-1,5-diisocyanate, etc. In addition the liquid reaction products of (1) diisocyanate and (2) polyols or polyamines may be utilized.

Any foaming agent may be employed provided that it is a material capable of liberating gaseous products during the polymerization reaction with an isocyanate, and in addition, low boiling solvents may be used. The preferred foaming agents are the fluorochlorocarbons boiling in the range of twenty to fifty degrees centigrade, and mixtures thereof, for example, trichlorofluoromethane, trichlorotrifluoroethane, dichloromonofluoromethane, monochloroethane, monochloromonofluoroethane, difluoromonochloroethane, difluorodichloroethane, etc. One foaming system which may be used is tertiary alcohols in the presence of strong, concentrated acid catalysts such as is disclosed and claimed in United States Pat. 2,865,869. Examples of tertiary alcohols include: tertiary amyl alcohol; tertiary butyl alcohol; 2-methyl-3-butyn-2-ol; 1-methyl-1-phenylethanol; and 1,1,2,2-tetraphenylethanol, etc. Examples of catalysts include: sulfuric acid; phosphoric acid; sulfonic acid; and aluminum chloride, etc. In addition, various secondary alcohols can be used such as: 1-phenyl-1,2-ethanediol; 2-butanol; and 2-methyl-2,4-pentanediol; etc. Generally, secondary alcohols should be used with strong, concentrated acid catalysts as above; however, certain secondary alcohols may be used without the acid catalyst, e.g., acetaldol, chloral hydrate, etc. Other foaming agents that may be used include the following: polycarboxylic acids; polycarboxylic acid anhydrides; dimethylol ureas; polymethylol phenols; formic acid and tetrahydroxymethylphosphonium chloride. In addition, mixtures of the above foaming agents may be employed.

Various additives can be incorporated which may serve to provide different properties. For instance, fillers, such as clay, calcium sulfate or ammonium phosphate may be added to lower cost, and improve density and fire resistance; ingredients such as dyes may be added for color, and fibrous glass, asbestos, or synthetic fibers may be added for strength.

The following examples will serve to illustrate the present invention and the improvements resulting therefrom.

EXAMPLE 1

*Preparation of Rigid Polyurethane Foam Utilizing a Polyester*

To one hundred grams of a polyester having a hydroxyl number of five hundred and four, and comprising the reaction product of five moles of trimethylol propane and three moles of adipic acid reacted to an acid number of one, was added 0.5 gram of silicone oil as a surfactant and 0.8 gram of N,N,N',N'-tetramethyl-1,3-butanediamine as a catalyst. The above ingredients were mixed thoroughly. To this mixture was added the following suspension:

One hundred and twenty grams of a semi-prepolymer prepared from twenty parts of the above resin and eighty parts of tolylene diisocyanate isomers consisting of a commercial mixture of eighty percent 2,4-tolylene diisocyanate and twenty percent 2,6-tolylene diisocyanate; and
Twenty-eight grams of trichlorofluoromethane; and
Fifteen grams of perchlorpentacyclo-(5.2.1,0$^{2,6}$.0$^{3,9}$.0$^{5,8}$)-decane (herinafter referred to as $C_{10}Cl_{12}$); and
Twenty-eight grams of 1,2-propylene glycol antimonite.

The mixture was stirred rapidly and poured into a mold. The resulting mixture was permitted to rise and cure at room temperature, yielding a foam having a density of 2.5 p.c.f., self-extinguishing, and having normal resilience. The burning rates of the above foam were as follows:

ASTM D–757 _____ 0.69 inch/minute.
UL 484 _____ 1.24 inches, 60.4 seconds.

A polyurethane foam prepared in the same manner using antimony trioxide was found to have very poor resilience.

EXAMPLE 2

*Preparation of a Rigid Polyurethane Foam Utilizing a Polyether*

To one hundred grams of a polyether having a hydroxyl number of four hundred and ninety and comprising the reaction product of one mole of sorbitol and ten moles of propylene oxide was added 0.5 gram of silicone oil as a surfactant and 0.8 gram of N,N,N',N'-tetramethyl-1,3-butanediamine as a catalyst. The ingredients were mixed thoroughly. To this mixture was added the following suspension:

One hundred and twenty grams of a semi-prepolymer prepared from twenty parts of the above polyether and eighty parts of tolylene diisocyanate isomers consisting of a commercial mixture of eighty percent 2,4-tolylene diisocyanate and twenty percent of 2,6-tolylene diisocyanate; and
Twenty-eight grams of trichlorofluoromethane; and
Thirty-seven grams $C_{10}Cl_{12}$; and
Twenty grams of 1,2-propylene glycol antimonite.

The mixture was stirred rapidly, poured into a mold, and permitted to rise and cure at room temperature. The resultant foam had a density of 2.5 p.c.f. was self-extinguishing and exhibited normal resilience. The burning rates of the above foam were as follows:

ASTM D–757 _____ 0.76 inch/minute.
UL 484 _____ 2.06 inches, 96.8 seconds.

A polyurethane foam prepared in the same manner using sodium antimonate exhibited very poor resilience.

In the following chart various polyurethane foams were prepared in a manner after Examples 1 and 2. In every case the resultant foam had a low density, normal resilience and exhibited properties as indicated.

| Example | 100 Grams Resin | 120 Grams Semi-Prepolymer | Additive | Type of Foam | BURNING RATE | | Inches Burnt |
|---|---|---|---|---|---|---|---|
| | | | | | ASTM D-757, Inches/Min. | UL-484, Seconds | |
| 3 | Polyester of Example 1 | As Example 1 | None | Rigid | 9.68 | 126.6 | 6.0 |
| 4 | ----do---- | ----do---- | 15 grams $C_{10}Cl_{12}$ | ---do--- | 10.0 | 153.0 | 5.87 |
| 5 | ----do---- | ----do---- | 15 g. Mixt. chlorinated aliphatic hydrocarbons[1] 20 g. Ethylene Glycol Antimonite. | ---do--- | 1.15 | 65.2 | 1.51 |
| 6 | ----do---- | Semi-Prepolymer A[2] | None | ---do--- | 6.90 | 165.4 | 6.0 |
| 7 | ----do---- | ----do---- | 20 g. 1,2-propylene Glycol Antimonite. | ---do--- | 0.59 | 49.6 | 1.08 |
| 8 | Polyether of Example 2 | As Example 2 | None | ---do--- | 15.58 | 94.6 | 6.0 |
| 9 | ----do---- | ----do---- | 30 g. $C_{10}Cl_{12}$ | ---do--- | 11.54 | 128.8 | 6.0 |
| 2 | ----do---- | ----do---- | 37 g. $C_{10}Cl_{12}$, 20 g. 1,2-propylene glycol antimonite. | ---do--- | 0.76 | 96.8 | 2.06 |

[1] A mixture of solid chlorinated aliphatic hydrocarbons containing seventy percent chlorine.
[2] Semi-prepolymer A is the reaction product of seventy-five parts of tolylene diisocyanate isomers as in Example 1 and twenty-five parts of a polyester comprised of 7.6 moles of glycerol, four moles of 1,4,5,6,7,7-hexachlorobicyclo-(2.2.1)-5-heptene-2,3-dicarboxylic acid, and two moles of adipic acid reacted to an acid number of five.

EXAMPLE 10

*Preparation of a Flexible Polyurethane Foam From a Polyether*

The following were mixed until a homogeneous suspension occurred:

One hundred and ninety-one grams of polyether having a hydroxyl number of sixty-six and comprising the reaction product of one mole of trimethylolpropane and 41.5 moles of propylene oxide; and
One hundred and seventeen grams of polyether having a hydroxyl number of one hundred and ten and comprising the reaction product of one mole of trimethylolpropane and 24.5 moles of propylene oxide; and
3.1 grams of silicone oil; and
1.1 grams of dibutyl tin dilaurate; and
14.4 grams of water;
Forty-seven grams of 1,2-propylene glycol antimonite; and
Ninety-three grams of $C_{10}Cl_{12}$.

Then one hundred and forty-nine grams of tolylene diisocyanate isomers as in Example 1 were added with rapid stirring. The liquid was poured into a mold and permitted to expand at room temperature for three minutes. The foam was placed in an oven for fifteen minutes at seventy-five degrees centigrade, crushed, then cured for one hour at one hundred and twenty degrees centigrade.

The foam had normal resilience, was tough and was flame retardant. In addition, the melt was flame retardant. Heat aging at one hundred and twenty degrees centigrade for two weeks showed no loss of resilience, while a similar sample without the 1,2-propylene glycol antimonite was totally degraded in two days.

EXAMPLE 11

*Comparative Example*

Example 1 was repeated, utilizing twenty-eight grams of 2,3-butylene glycol antimonite instead of 1,2-propylene glycol antimonite. Gelation occurred within five seconds.

This invention may be embodied in other forms or carried out in other ways without departing from the spirit or essential characteristics thereof. The present embodiment is therefore to be considered as in all respects illustrative and not restrictive, the scope of the vention being indicated by the appended claims, and all changes which come within the meaning and range of equivalence are intended to be embraced therein.

We claim:

1. A fire-resistant cellular reaction product comprising the reaction product of (1) a hydroxyl-containing polymer having a hydroxyl number of between about twenty-five and nine hundred, (2) an organic polyisocyanate, (3) from about five to fifty percent by weight of an antimony compound selected from the group consisting of ethylene glycol antimonite, 1,2-propylene glycol antimonite, and mixtures thereof, and (4) a foaming agent.

2. A fire-resistant cellular reaction product according to claim 1 wherein said hydroxyl-containing polymer is selected from the group consisting of a polyester, a polyether, and mixtures thereof.

3. A fire-resistant cellular reaction product according to claim 2 wherein said hydroxyl-containing polymer is a polyester comprising the reaction product of a polyhydric alcohol and a polycarboxylic compound.

4. A fire-resistant cellular reaction product according to claim 2 wherein said hydroxyl-containing polymer is a polyether comprising the reaction product of a monomeric 1,2-epoxide and a material selected from the group consisting of a polyhydric alcohol and a polycarboxylic acid.

5. A fire-resistant cellular product according to claim 3 wherein the polyhydric alcohol portion of said polyester contains an adduct of hexahalocyclopentadiene and a polyhydric alcohol.

6. A fire-resistant cellular reaction product according to claim 3 wherein the polycarboxylic acid portion of said polyester contains an adduct of hexahalocyclopentadiene and a polycarboxylic acid.

7. A fire-resistant cellular reaction product according to claim 2 having from about three to twenty percent halogen based on the weight of said reaction product.

8. A fire-resistant cellular reaction product according to claim 2 wherein said antimony compound is ethylene glycol antimonite.

9. A fire-resistant cellular reaction product according to claim 2 wherein said antimony compound is 1,2-propylene glycol antimonite.

10. A polyurethane foamed product having chemically combined therein from about five to fifty percent by weight of an antimony compound selected from the group consisting of ethylene glycol antimonite, 1,2-propylene glycol antimonite, and mixtures thereof.

References Cited in the file of this patent

UNITED STATES PATENTS 2,577,281   Simon et al. _____ Dec. 4, 1951